(12) United States Patent
Yamamoto et al.

(10) Patent No.: US 7,629,063 B2
(45) Date of Patent: Dec. 8, 2009

(54) FLAME RETARDANT AND FLAME-RETARDANT RESIN COMPOSITION

(75) Inventors: Minoru Yamamoto, Tokushima (JP); Daisuke Suzuki, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 538 days.

(21) Appl. No.: 10/585,824

(22) PCT Filed: Jan. 5, 2005

(86) PCT No.: PCT/JP2005/000035

§ 371 (c)(1), (2), (4) Date: Jul. 12, 2006

(87) PCT Pub. No.: WO2005/068558

PCT Pub. Date: Jul. 28, 2005

(65) Prior Publication Data

US 2008/0234412 A1 Sep. 25, 2008

(30) Foreign Application Priority Data

Jan. 16, 2004 (JP) .............................. 2004-009707

(51) Int. Cl.
*B32B 19/02* (2006.01)

(52) U.S. Cl. ........................ 428/704; 428/702; 524/413; 252/609

(58) Field of Classification Search ................ 423/598, 423/609, 610; 428/220, 702, 704; 524/413, 524/430–436; 252/609
See application file for complete search history.

(56) References Cited

U.S. PATENT DOCUMENTS 7,455,826 B2 * 11/2008 Inubushi et al. ............. 423/598

2004/0152910 A1 8/2004 Fukuoka et al. ............... 558/75
2004/0234447 A1 11/2004 Inubushi et al. ............. 423/598

FOREIGN PATENT DOCUMENTS

| CN | 1543437 A | 11/2004 |
|---|---|---|
| JP | 6-93133 A | 4/1994 |
| JP | 8-109287 A | 4/1996 |
| JP | 10-338796 A | 12/1998 |
| JP | 11-106597 A | 4/1999 |
| JP | 11-189710 A | 7/1999 |
| JP | 11-228748 A | 8/1999 |
| JP | 2979132 B1 | 9/1999 |
| JP | 3062497 B1 | 4/2000 |
| JP | 2001-316564 A | 11/2001 |
| JP | 2002-363194 A | 12/2002 |
| JP | 2003-138146 A | 5/2003 |
| JP | 2003-342482 A | 12/2003 |
| WO | 99/11574 A1 | 3/1999 |
| WO | 03/016218 A1 | 2/2003 |

* cited by examiner

*Primary Examiner*—Peter Szekely
(74) *Attorney, Agent, or Firm*—Kubovcik & Kubovcik

(57) ABSTRACT

A flame-retardant, characterized in that it comprises a layered titanic acid in the form of a nano sheet which is formed by a method comprising treating a layered titanic acid salt with an acid or warm water and then reacting the resultant mixture with an organic basic compound, or carrying out the step of treating a layered titanic acid salt with an acid or warm water and the step of reacting with an organic basic compound, in one pot, to thereby swell or separate the layers; and a flame-retardant resin composition, characterized in that it comprises 100 parts by weight of a resin and 0.5 to 50 parts by weight of the above layered titanic acid in the form of a nano sheet.

16 Claims, No Drawings

FLAME RETARDANT AND FLAME-RETARDANT RESIN COMPOSITION

TECHNICAL FIELD

The present invention relates to a flame retardant and a flame-retardant resin composition.

BACKGROUND ART

In general, resins such as polyethylene, polypropylene, polyester, polyurethane, polymethacrylate and epoxy resins have achieved wide use for many purposes including packages of electrical appliances, construction materials, fibers and daily commodities, because of their electrical insulating properties, strength, lightweight properties, heat resistance, water resistance and chemical resistance. However, since these general resins consist mainly of carbon, hydrogen and/or oxygen and thus readily catch fire, leading to combustion that evolves tremendous flames, heat and toxic smoke, their uses are extremely limited. This has led to development of various flame retardants. Known organic flame retardants include halogen flame retardants and phosphorous flame retardants. Known inorganic flame retardants include antimony oxide compounds, metal hydroxides such as magnesium oxide and aluminum hydroxide, and boron compounds. These are used alone or in combination. The selective combination of flame retardants such as, for example, a mixture of a halogen flame retardant and an antimony oxide compound, is known to have a synergistic effect. In Patent Literature 1, for example, a resin composition is disclosed which contains a halogen flame retardant and an antimony oxide compound. However, this resin composition evolves a toxic halogen (bromine and chlorine) gas when it is exposed to high temperature or processed, which has been a problem. Also, the antimony oxide compound is toxic and possible to cause antimony poisoning. Therefore, its use is undesirable for reasons of environment and health.

In Patent Literature 2, a phosphorous flame retardant is disclosed. However, if a sufficient flame-retardant effect is to be obtained with the sole use of this flame retardant, it must be incorporated in the amount of at least 10% by weight, based on 100 parts by weight of the resin. This causes hydrolysis of the resin at high temperature and accordingly lowers its physical properties.

Also in case of magnesium hydroxide or aluminum hydroxide, it must be incorporated in a large amount in order to impart sufficient flame retardance. This lowers mechanical strength.

Use of an inorganic layered compound (silicate such as montmorillonite) as a flame retardant has also been proposed. In Patent Literature 3, a layered clay mineral/halogen flame retardant/antimony oxide combination is proposed. In Patent Literature 4, a layered clay mineral/phosphate ester flame retardant/antimony oxide combination is proposed. However, these use a toxic halogen flame retardant or antimony oxide compound and are thus undesirable for reasons of environment and health.

After all, a flame retardant for a general resin has not been developed so far which can avoid environmental and health concerns and achieve a UL94 flame retardance rating of V-O or V-1 without impairing intrinsic properties of the resin.

Patent Literature 1: Japanese Patent Laid-Open No. Hei 8-109287
Patent Literature 2: Japanese Patent Laid-Open No. Hei 11-106597
Patent Literature 3: Japanese Patent Laid-Open No. Hei 11-189710
Patent Literature 4: Japanese Patent Laid-Open No. Hei 11-228748
Patent Literature 5: Japanese Patent Registration No. 2979132
Patent Literature 6: International Publication No. 99/11574 pamphlet
Patent Literature 7: Japanese Patent Registration No. 3062497
Patent Literature 8: International Publication No. 03/016218 pamphlet
Patent Literature 9: Japanese Patent Laid-Open No. Hei 6-93133

DISCLOSURE OF THE INVENTION

It is an object of the present invention to provide a novel flame retardant and a flame-retardant resin composition containing the flame retardant.

A flame retardant according to a first aspect of the present invention is useful for incorporation in a resin to impart flame retardance thereto and characterized as comprising a layered titanic acid in the form of nanosheets intercalated with an organic basic compound.

The layered titanic acid in the form of nanosheets can be obtained, for example, by treating a layered titanate with an acid or hot water and then allowing an organic basic compound to act on the layered titanate to effect swelling of interlayer spaces or delamination. It may alternatively be obtained by performing the step of treating a layered titanate with an acid or hot water and the step of allowing an organic basic compound to act on the layered titanate, in one pot, to thereby effect swelling of interlayer spaces or delamination.

A flame retardant according to a second aspect of the present invention is characterized as comprising a layered titanic acid in the form of nanosheets which is obtained by inserting a halogen-free phosphazene compound or halogen-free flame-retardant nitrogen heterocyclic compound between layers of the layered titanic acid in the form of nanosheets according to the first aspect of the present invention. That is, the flame retardant according to the second aspect of the present invention is useful for incorporation in a resin to impart flame retardance thereto and characterized in that it comprises a layered titanic acid in the form of nanosheets intercalated either with an organic basic compound and a halogen-free phosphazene compound or halogen-free flame-retardant nitrogen heterocyclic compound, or with a halogen-free phosphazene compound or halogen-free flame-retardant nitrogen hetero-cyclic compound.

The layered titanic acid in the form of nanosheets according to the second aspect can be obtained, for example, by treating a layered titanate with an acid or hot water and then allowing an organic basic compound and a halogen-free phosphazene compound or halogen-free flame-retardant nitrogen heterocyclic compound to act on the layered titanate, or alternatively, allowing a halogen-free phosphazene compound or halogen-free flame-retardant nitrogen heterocyclic compound alone to act on the layered titanate to thereby effect swelling of interlayer spaces or delamination. It may alternatively be obtained by performing the step of treating a layered titanate with an acid or hot water and the step of allowing an organic basic compound and/or a halogen-free phosphazene compound or halogen-free flame-retardant nitrogen hetero-cyclic compound to act on the layered titanate, in one pot, to thereby effect swelling of interlayer spaces or delamination.

A flame-retardant resin composition according to a third aspect of the present invention is characterized in that it contains 0.5-50 parts by weight of the layered titanic acid in the form of nanosheets according to the first or second aspect of the present invention, based on 100 parts by weight of a resin.

The layered titanic acid in the form of nanosheets, present in the resin, preferably has an aspect ratio (Z) in the range of 50-100,000.

Preferably, the flame-retardant resin composition of the present invention may further contain other flame retardant, besides the layered titanic acid in the form of nanosheets. For example, it may further contain 0.01-50 parts by weight of a halogen-free phosphazene compound, based on 100 parts by weight of the resin. Alternatively, in addition to containing the layered titanic acid in the form of nanosheets, it may further contain a halogen-free organic or inorganic flame retardant in the amount of 0.01-50 parts by weight, based on 100 parts by weight of the resin.

A resin product of the present invention is characterized in that it is obtained by processing the flame-retardant resin composition of the present invention. The resin product of the present invention includes a film.

Due presumably to the following, the layered titanic acid in the form of nanosheets in the present invention, when added to a resin, imparts flame retardance thereto. The layered titanic acid in the form of nanosheets according to the present invention, when incorporated in the resin, swells and cleaves to sizes of several nm-several tens nm to form nanocomposites dispersed in the resin and spaced several tens nm-several hundreds nm from each other. The resultant thus exhibits gas barrier and liquid barrier functions. That is, it blocks and retards contact of combustion-sustaining air with a combustible gas or resin drip produced when the resin is exposed to high temperature. Also, the layered titanic acid in the form of nanosheets has heat-insulating properties. It is believed that these together work to secure a delay period during which a gas or drip once produced via burning at a surface of the resin solidifies to form a flame-retardant carbonized solid (char) and as a result extinguish a fire.

The layered titanic acid in the form of nanosheets can be rendered more flame-retardant by insertion of a particular flame retardant between its layers. Specifically, the layered titanic acid in the form of nanosheets can be rendered more flame-retardant by inserting a halogen-free phosphazene compound or halogen-free flame-retardant nitrogen heterocyclic compound between its layers, as described above. Insertion of these flame retardants becomes more effective particularly when the layered titanic acid in the form of nanosheets has a relatively low aspect ratio.

Flame retardance can be imparted by a less amount of the layered titanic acid in the form of nanosheets of the present invention, if it is used in combination with the other flame retardant. Examples of other flame retardants include a halogen-free phosphazene compound, and halogen-free organic and inorganic flame retardants.

In accordance with the present invention, improved flame retardance can be imparted to a resin by gas barrier, liquid barrier and heat-insulating properties of the layered titanic acid in the form of nanosheets. Also, a resin can be imparted thereto high flame retardance while maintaining good mechanical strength, due to the mechanical strength and heat resistance presumably originating in the layered titanic acid in the form of nanosheets. Therefore, shape destruction and flame spread can be suppressed even if the resin is burned.

Also in accordance with the present invention, improved flame retardance can be imparted to a resin without addition of halogens and antimony compounds. A resin composition can thus be provided which is environmentally advantageous on the occasion where it is disposed as a waste after use.

BEST MODE FOR CARRYING OUT THE INVENTION

The layered titanic acid in the form of nanosheets, for use in the first aspect of the present invention, can be prepared by steps of treating a layered titanate with an acid or hot water and allowing an organic basic compound having an interlayer space swelling effect to act on the layered titanate. More specifically, it can be obtained by a preparation method including the steps of:

(1) treating a layered titanate with an acid or hot water to substitute hydrogen and/or hydronium ions for metal ions other than Ti; and (2) allowing an organic basic compound having an interlayer space swelling effect to act on the layered titanate to effect swelling of interlayer spaces or delamination.

The layered titanate as a raw material is illustrated by $Cs_{0.7}Ti_{1.83}O_4$ which is obtained by mixing cesium carbonate and titanium dioxide at a ratio of 1:5.3 and firing the mixture at 800° C., according to the method disclosed in Patent Literature 5.

Another example is $K_{0.8}Li_{0.27}Ti_{1.73}O_4$ which is obtained by mixing potassium carbonate, lithium carbonate and titanium dioxide at a ratio of K/Li/Ti=3/1/6.5 (molar ratio), grinding and firing the mixture at 800° C., according to the method disclosed in Patent Literature 6.

A further example is a layered titanate represented by a general formula $A_xM_y\square Ti_{2-(y+z)}O_4$ (in the formula, A and M are metals differing from each other and having a valence of 1-3, $\square$ is a defective site of Ti, x is a positive real number satisfying 0<x<1.0, and y and z are independently 0 or a positive real number satisfying 0<y+z<1.0) which can be obtained by using an alkali metal, a halide or sulfate thereof as a flux, mixing this flux and a raw material at a flux/raw material ratio of 0.1-2.0 and firing the mixture at 700-1,200° C., according to the method disclosed in Patent Literature 7. In the above formula, A denotes a metal having a valence of 1-3, preferably at least one selected from K, Rb and Cs; M denotes a metal different from the metal A and having a valence of 1-3, preferably at least one selected from Li, Mg, Zn, Cu, Fe, Al, Ga, Mn and Ni. Specific examples of layered titanates include $K_{0.80}Li_{0.27}Ti_{1.73}O_4$, $Rb_{0.75}Ti_{1.75}Li_{0.25}O_4$, $Cs_{0.70}Li_{0.23}Ti_{1.77}O_4$, $Ce_{0.70}\square_{0.18}Ti_{1.83}O_4$, $Ce_{0.70}Mg_{0.35}Ti_{1.65}O_4$, $K_{0.8}Mg_{0.4}Ti_{1.6}O_4$, $K_{0.8}Ni_{0.4}Ti_{1.6}O_4$, $K_{0.8}Zn_{0.4}Ti_{1.6}O_4$, $K_{0.8}Cu_{0.4}Ti_{1.6}O_4$, $K_{0.8}Fe_{0.8}Ti_{1.2}O_4$, $K_{0.8}Mn_{0.8}Ti_{1.2}O_4$, $K_{0.76}Li_{0.22}Mg_{0.05}Ti_{1.73}O_4$ and $K_{0.67}Li_{0.2}Al_{0.07}Ti_{1.73}O_4$.

A further specific example is $K_{0.5-0.7}Li_{0.27}Ti_{1.73}O_{3.05-3.95}$ which is obtained by washing $K_{0.8}Li_{0.27}Ti_{1.73}O_4$ with an acid, followed by firing, according to the method disclosed in Patent Literature 8.

The preferred layered titanate for use as a raw material in the present invention is a layered titanate represented by a general formula $A_xM_y\square Ti_{2-(y+z)}O_4$ (in the formula, A and M are different metals having a valence of 1-3, $\square$ is a defective site of Ti, x is a positive real number satisfying 0<x<1.0, and y and z are independently 0 or a positive real number satisfying 0<y+z<1.0), particularly preferably $K_{0.8}Li_{0.27}Ti_{1.73}O_4$.

A method (preparation method 1) in which the steps (1) and (2) are sequentially performed and a method (preparation method 2) in which the steps (1) and (2) are performed in one pot can be both utilized to prepare the layered titanic acid in the form of nanosheets for use in the present invention.

In the method (preparation method 1) wherein the steps (1) and (2) are sequentially performed, the layered titanate represented by the above formula, for example, is first treated with an acid or hot water (Step (1)).

In case of an acid treatment, an acid may be added to an aqueous dispersion of the layered titanate represented by the above formula, for example, preferably under stirring. The amount of the layered titanate in the aqueous dispersion is not particularly specified and may be suitably chosen depending on workability and the others. While organic acids can be used, inorganic acids such as hydrochloric acid, sulfuric acid, nitric acid, phosphoric acid and boric acid are preferably used. The use amount of the acid can be suitably selected from a wide range depending on the percent substitution of hydrogen and/or hydronium ions for the A and/or M ions in the layered titanate represented by the above general formula, but may generally be 10-2,000 equivalent % of an ion exchange capacity of the layered titanate. The acid treatment may be performed either in a single operation or repeatedly with the acid being reduced in concentration or use amount. The percent substitution can be easily varied by the acid treatment if performed repeatedly Accordingly, even with the use of a small amount of an acid, the percent substitution can be varied with the number of repeated operations. A reaction is effected generally at room temperature-40° C. for 30 minutes-24 hours.

In case of the hot water treatment, the layered titanate may be dispersed in hot water generally at 40° C. or above, preferably at 60° C. or above, which is subsequently stirred. The hot water treatment is terminated generally in 1-10 hours, preferably in 2-5 hours. The hot water treatment may be performed repeatedly.

The acid or hot water treatment results in obtaining a layered titanic acid containing hydrogen and/or hydronium ions substituted for the A and/or M ions in the layered titanate. For the layered titanic acid, the percent substitution of hydrogen and/or hydronium ions for the metal denoted by A and/or M can be measured by a method known in the art. For example, Li can be quantitatively determined by dissolving a sample in sulfuric acid containing ammonium sulfate and then subjecting to flame spectrochemical analysis. K, Ti, Mg, Rb, Cs, Zn, Al, Fe, Mn, Cu, Ni, Ga and others can be quantitatively determined by fluorescent X-ray analysis. Thus, the percent substitution can be calculated by quantitatively determining the weight of the metal before and after the acid or hot water treatment.

Next, an organic basic compound having an interlayer space swelling effect is allowed to act on the above-obtained layered titanic acid to thereby effect swelling of interlayer spaces or delamination (Step (2)).

Examples of organic basic compounds having an interlayer space swelling effect include primary-tertiary amines and their salts, alkanolamines and their salts, quaternary ammonium salts, phosphonium salts, and amino acids and their salts. Examples of primary amines include methylamine, ethylamine, n-propylamine, butylamine, pentylamine, hexylamine, octylamine, dodecylamine, stearylamine, 2-ethylhexylamine, 3-methoxy-propylamine, 3-ethoxypropylamine and their salts. Examples of secondary amines include diethyl-amine, dipentylamine, di-octylamine, dibenzylamine, di(2-ethyl-hexyl)amine, di(3-ethoxypropyl)amine and their salts. Examples of tertiary amines include triethylamine, tri-octylamine, tri(2-ethylhexyl)amine, tri(3-ethoxypropyl)amine, dipolyoxyethylene dodecylamine and their salts. Examples of alkanolamines include ethanolamine, diethanolamine, tri-ethanolamine, isopropanolamine, diisopropanolamine, tri-isopropanolamine, N,N-dimethylethanolamine, 2-amino-2-methyl-1-propanol and their salts. Examples of hydroxyl quaternary ammonium salts include tetramethylammonium hydroxide, tetraethylammonium hydroxide, tetrapropylammonium hydroxide and tetrabutylammoniumhydroxide. Examples of quaternary ammonium salts include dodecyltrimethylammonium salts, cetyltrimethylammonium salts, stearyltrimethyl-ammonium salts, benzyltrimethylammonium salts, benzyl-tributylammonium salts, trimethylphenylammonium salts, dimethyldistearylammonium salts, dimethyldidecylammonium salts, dimethylstearylbenzylammonium salts, dodecyl-bis(2-hydroxyethyl) methylammonium salts, trioctylmethylammonium salts and dipolyoxyethylenedodecylmethylammonium salts.

Examples of phosphonium salts include organic phosphonium salts such as tetrabutylphosphonium salts, hexadecyltributylphosphonium salts, dodecyltributyl-phosphonium salts, dodecyltriphenylphosphonium salts. Amines such as 12-aminododecanic acid and aminocaproic acid and their salts, and imines such as polyethylene imine and their salts are also useful.

These organic basic compounds can be used alone or in combination, depending on the particular purposes.

For the effective action of the organic basic compound having an interlayer space swelling effect, the organic basic compound may be added, either directly or in the form of its dilute solution in an aqueous medium, to a suspension in which the layered titanic acid resulting from the acid or hot water treatment is dispersed in an aqueous medium under stirring. Alternatively, the layered titanic acid or its suspension may be added to an aqueous solution of the organic basic compound while it is stirred.

The aqueous medium or aqueous solution, as used above, refers to water, water-soluble solvents, mixed solvents of water and water-soluble solvents, and their solutions.

Examples of water-soluble solvents include alcohols such as methyl alcohol, ethyl alcohol and isopropyl alcohol; ketones such as acetone; ethers such as tetrahydrofuran and dioxane; nitriles such as acetonitrile; esters such as ethyl acetate and propylene carbonate; and the like.

The organic basic compound may preferably be added in the amount of 1-200 equivalent %, more preferably 5-100 equivalent %, of anion exchange capacity of the layered titanate represented by the above general formula. The ion exchange capacity, as used herein, refers to a value given by mx+my, wherein m and n denote valences of A and M in the preceding general formula representing the layered titanate, respectively.

A reaction is effected generally at 60-90° C. for 30 minutes-24 hours.

The above preparation method 1 results in obtaining a layered titanic acid in the form of nanosheets for use in the present invention.

In the method (preparation method 2) in which steps (1) and (2) are performed in one pot, an acid and an organic basic compound having an interlayer space swelling effect are allowed to act on the layered titanate represented by the preceding general formula, in one pot. In the present invention, by one pot, it is meant that the acid and the organic basic compound are added either sequentially without being intervened by cleaning or other process or simultaneously.

For example, an acid may be added, either directly or in the form of its dilute solution in an aqueous medium, to a suspension in which the layered titanic acid is dispersed in an aqueous medium under stirring, followed by further addition of an organic basic compound having an interlayer space swelling effect or its dilute solution in an aqueous medium. Alternatively, an organic basic compound having an interlayer space swelling effect may be added, either directly or in the form of its dilute solution in an aqueous medium, to a suspension in which the layered titanic acid is dispersed in an aqueous medium under stirring, followed by further addition of an acid or its dilute solution in an aqueous medium. Alternatively, a mixture of an organic basic compound having an interlayer space swelling effect and an acid may be added, either directly or in the form of its dilute solution in an aqueous medium, to the above suspension. This sequence may be reversed. That is, a layered titanate may be added, either directly or in the form of a dispersion in an aqueous medium, to the aforementioned mixture of an acid and an organic basic compound. The aqueous medium, as used herein, encompasses water, water-soluble solvents and mixed solvents of water and water-soluble solvents. Examples of useful water-soluble solvents are listed in the description of (preparation method 1).

Examples of useful acids are also listed in the description of (preparation method 1).

The use amount of an acid can be suitably selected from a wide range depending on the percent substitution of hydrogen and/or hydronium ions for the A and/or M ions in above general formula representing the layered titanate, but may generally be 50-250 equivalent %, preferably 10-200 equivalent %, of an ion exchange capacity of the layered titanate. If its use amount exceeds 200 equivalent %, swelling of interlayer spaces becomes difficult to occur, although substitution of hydrogen and/or hydronium ions for the A and/or M ions occurs.

Examples of useful organic basic compounds having an interlayer space swelling effect are listed in the description of (preparation method 1).

The organic basic compound having an interlayer space swelling effect is used in the amount of 5-100 equivalent %, preferably 10-100 equivalent %, of an ion exchange capacity of the layered titanate. If its use amount is less than 5 equivalent %, swelling hardly proceeds. Even if its use amount is increased to over 100 equivalent %, its effect on swelling little increases. This is not only an economical disadvantage but possible to interfere filtering or other process.

When the organic basic compound having an interlayer space swelling effect and the acid are allowed to act on the layered titanate in one pot, heating is not particularly a requirement. However, heating may be applied to promote a reaction or promote dissolution of the organic basic compound having an interlayer space swelling effect.

The reaction is effected generally at 60-90° C. for 30 minutes-24 hours.

The above-described preparation method 2 results in obtaining the layered titanic acid in the form of nanosheets for use in the present invention.

The layered titanic acid in the form of nanosheets for use in the present invention has a plate-like or sheet-like (flaky) shape, a mean thickness generally of 0.5 nm-20 μm, preferably 1 nm-10 μm, and a mean major length generally of 0.1-100 μm, preferably 1-50 μm.

The layered titanic acid in the form of nanosheets according to the second aspect of the present invention can be prepared using a layered titanate as a raw material, as similar to the layered titanic acid in the form of nanosheets according to the first aspect of the present invention. Specifically, the first aspect of the present invention may be followed to treat the layered titanate represented by the preceding general formula with an acid or hot water. Thereafter, a halogen-free phosphazene compound or halogen-free flame-retardant nitrogen heterocyclic compound, instead of the organic basic compound having an interlayer space swelling effect, is allowed to act on the layered titanate. Alternatively, the basic compound having an interlayer space swelling effect and the halogen-free phosphazene compound or the halogen-free flame-retardant nitrogen heterocyclic compound are allowed to act sequentially on the layered titanate.

These compounds and the organic basic compound may be allowed to act simultaneously on the layered titanate so that they are simultaneously inserted between the layers. The halogen-free phosphazene compound and halogen-free flame-retardant nitrogen heterocyclic compound will be described later in detail.

In the second aspect of the present invention, the amount of the halogen-free phosphazene compound or halogen-free flame-retardant nitrogen heterocyclic compound may be 1-200 equivalent %, preferably 5-100 equivalent %, of anion exchange capacity of the layered titanate.

These compounds may be used alone or in combination, depending on the particular purpose.

In the flame-retardant resin composition according to the third aspect of the present invention, the loading of the layered titanic acid in the form of nanosheets according to the first or second aspect is varied depending on the type of the resin used. It is generally loaded in the amount of 0.5-50 parts by weight, preferably 1-20 parts by weight, based on 100 parts by weight of the resin.

Examples of flame retardants for use in the present invention are halogen-free phosphazene compounds, halogen-free flame-retardant nitrogen heterocyclic compounds and halogen-free organic and inorganic flame retardants.

The type of the halogen-free phosphazene compound is not particularly specified. However, alkyloxy-substituted phosphazene compounds and crosslinked products thereof are preferred Examples are cyclic phenoxyphosphazene compounds represented by a general formula (A) and straight-chain or branched phenoxyphosphazene compounds represented by a general formula (B).

[CHEMICAL 1]

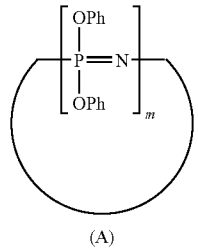

(A)

(in the formula, m denotes an integer of 3-25 and Ph denotes a phenyl group.)

[CHEMICAL 2]

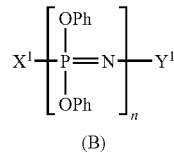

(B)

(in the formula, $X^1$ denotes a group $-N=P(OPh)_3$ or $-N=P(O)OPh$, $Y^1$ denotes a group $-N=P(OPh)_4$ or $-N=P(O)OPh_2$, n denotes an integer of 3-1,000 and Ph denotes a phenyl group.)

Crosslinked phenoxyphosphazene compounds can also be suitably used which are obtained by crosslinking the compound represented by the general formula (A) or (B) with at least one bridging group selected from the group consisting of an o-phenylene group, an m-phenylene group, a p-phenylene group and a bisphenylene group represented by a general formula (C).

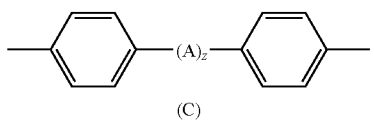

[CHEMICAL 3]

(C)

(in the formula, A denotes —C(CH$_3$)$_2$—, —SO$_2$—, —S— or —O— and z denotes 0 or 1.)

Examples of halogen-free flame-retardant nitrogen heterocyclic compounds include melamine derivatives such as melamine and methylol melamine; cyanuric acid, isocyanuric acid and their derivatives such as cyanuric acid, methyl cyanurate, diethyl cyanurate, trimethyl cyanurate, triethyl cyanurate, isocyanuric acid, N,N'-diethyl isocyanurate, tris(methyl) isocyanurate, tris(ethyl) isocyanurate, bis(2-carboxylethyl) isocyanurate, 1,3,5-tris(2-carboxyethyl) isocyanurate and tris(2,3-epoxypropyl) isocyanurate; salts of melamine (derivatives) such as melamine isocyanurate, and (iso)cyanuric acid (derivatives); tetrazole compounds including tetrazole amine salts such as tetrazole guanidine salts, tetrazole piperazine salts and tetrazole ammonium salts, and tetrazole metal salts such as tetrazole sodium salts and tetrazole manganese salts, e.g., 5,5'-bistetrazole diguanidine salt, 5,5'-bistetrazole diammonium salt, 5,5'-bistetrazole diaminoguanidine salt and 5,5'-bistetrazole piperazine salt.

The use amount thereof is 0.5-10 parts by weight, preferably 1-7 parts by weight, based on 100 parts by weight of the resin.

These flame retardants may be used alone or in combination, depending on the particular purpose.

Other than the above-described flame retardants, halogen-free organic and inorganic flame retardants can also be used.

Examples of organic flame retardants include aliphatic phosphate esters such as trimethyl phosphate, tributyl phosphate, tri(2-ethylhexyl) phosphate, tributoxyethyl phosphate, monoisodecyl phosphate and 2-acryloyloxyethylacid phosphate; aromatic phosphate esters such as triphenyl phosphate, tricresyl phosphate, trixylenylphosphate, tris(phenylphenyl) phosphate, trinaphthyl phosphate, cresyldiphenyl phosphate, xylenyldiphenyl phosphate and dipheny-2-methacryloyloxyethyl phosphate; aromatic bis(phosphate esters) such as resorcinol bis(diphenyl phosphate), resorcinol bis(dixylenyl phosphate), resorcinol bis(dicresyl phosphate), hydroquinone bis(dixylenyl phosphate), bisphenol-A bis(diphenyl phosphate); and their polymers, i.e., polyaromatic bis(phosphate esters), and other phosphate ester derivatives.

Examples of inorganic flame retardants include magnesium hydroxide, aluminum hydroxide, molybdenum hydroxide and talc. Further examples include water-containing inorganic compounds such as hydrated aluminum, kaolin/clay and zinc borate; nano-sized Al, Fe, Cu and other metals; and the like.

The use amount thereof is 0.05-50 parts by weight, preferably 0.1-10 parts by weight, based on 100 parts by weight of the resin. These flame retardants may be used alone or in combination, depending upon the particular purpose.

Among the above-listed flame retardants, the halogen-free phosphazene compounds and halogen-free flame-retardant nitrogen heterocyclic compounds are also useful for insertion between layers of the layered titanic acid in the form of nanosheets in the second aspect of the present invention.

It is extremely difficult to directly measure an aspect ration of the layered titanic acid in the form of nanosheets for use in the present invention while incorporated in the resin. However, a highly valid value for aspect ratio can be measured by a method such as disclosed in Patent Literature 9.

That is, an aspect ratio (Z) of the layered titanic acid in the form of nanosheets is defined by a relationship $Z=L/a$ [L denotes a particle size when determined in a solvent by dynamic light scattering method and a denotes a unit thickness of the layered titanate (unit thickness a can be determined such as by a powder X-ray diffraction method for the layered titanate alone.)] However, in $Z=L/a$, an interplanar spacing d obtained from powder X-ray diffraction of the composition exists and satisfies a relationship $a<d$. If a value of d−a exceeds a width of a single strand of the resin in the composition, this resin in the resin composition is supposed to be inserted between layers of the layered titanic acid in the form of nanosheets. This clearly suggests that the layered titanic acid in the form of nanosheets has the unit thickness a. Also considering the case where the layered titanic acid is swelled sufficiently with the same type of solvent as used in the dynamic light scattering and combined with the resin, a particle size of the layered titanic acid in the form of nanosheets in the resin is believed to be very close to that in the solvent. From the above two points, the preceding definition of aspect ratio is believed to carry relatively high validity. In the present invention, the particle size and the aspect ratio refer to those defined above.

The resin is not particularly specified in type. Examples of useful thermosetting resins include bisphenol A epoxy resins, bisphenol F epoxy resins, bisphenol S epoxy resins, phenol-novolak epoxy resins, cresol-novolak epoxy resins, naphthalene epoxy resins, biphenyl epoxy resins, N-glycidyl compounds and glycidyl amine epoxy resins derived from aromatic amines and heterocyclic bases, and further include unsaturated polyester resins, vinyl ester resins, phenol resins, poly-urethane resins, polyimide resins and any other thermosetting resins known in the art to be useful.

Examples of thermoplastic resins include polyolefin, polyester, polycarbonate, methyl polymethacrylate, polyether ether ketone, and engineering plastics such as liquid crystal polymers.

The layered titanic acid in the form of nanosheets of the present invention also works effectively on biodegradable resins particularly noticed in recent years and rubbers noticed for their flame retardance. Illustrating examples include biodegradable resins such as polylactic acid, polybutylene succinate and polyvinyl alcohol; and rubbers such as natural rubber, butadiene rubber, NBR and SBR.

The flame-retardant thermosetting resin composition of the present invention can be prepared by adding the layered titanic acid in the form of nanosheets, optionally together with an organic or inorganic flame retardant, to a thermosetting resin and then mixing and kneading them in a kneading machine such as a Banbury mixer, kneader or mixing roll. If necessary, a curing agent or a cure accelerator is further introduced, followed by mixing and degassing. The resulting composition is cast in a mold and cured, or alternatively, heat pressed before cure is complete. The thermosetting resin may be made into a solution form by dissolving it into an organic solvent, before those operations are performed. Then, the resulting composition may be cast on a fluoroplastic sheet to provide a film.

The flame-retardant thermoplastic resin composition of the present invention can be prepared by adding a predetermined amount of the layered titanic acid in the form or nanosheets, optionally together with a resin additive, to a thermoplastic resin and then mixing or kneading them according to conventional means. For example, those components in the form of a powder, beads, flakes or pellets are mixed in a mixer or tumbler, when necessary, and then mixed and kneaded using an extruder such as a single- or twin-screw extruder and a kneader such as a Banbury mixer, kneader or mixing roll to prepare the flame-retardant resin composition of the present invention. The thus-obtained resin composition is formed into pellets by a grinder or pelletizer and then processed into various shapes such as a film, tube or sheet according to injection molding, extrusion or other conventional processing means. Also, a masterbatch may be prepared which contains a high concentration of the layered titanic acid in the form of nanosheets. This masterbatch may be diluted or mixed with a resin, either similar or dissimilar to that in the masterbatch, before it is processed through injection molding or extrusion.

The flame-retardant resin composition of the present invention can be formed into various shapes such as for use as film, fibers and sheet, by injection, extrusion or other processing methods. Examples of films include nonoriented, monoaxially oriented, and biaxially oriented films. Examples of fibers include nonoriented and oriented fibers. These are also applicable for various uses, including electrical and electronic parts, construction members, automobile parts and daily necessaries.

The flame-retardant resin composition of the present invention can be made into foams by using conventional expansion methods. If necessary, the resin composition of the present invention may further contain an antioxidant, light stabilizer, antistatic agent, processing aid or the like.

EXAMPLES

The flame-retardant resin composition incorporating the layered titanic acid in the form of nanosheets and the preparation method thereof are described in more detail by way of Synthesis Examples, Examples and Comparative Examples. However, the present invention is not limited to such Synthesis Examples and Examples. All percentages and parts in the following examples are on a weight basis, unless otherwise specified.

(Synthesis of Layered Titanate)

Synthesis Example 1

27.64 g of sodium carbonate, 4.91 g of lithium carbonate, 69.23 g of titanium dioxide and 74.56 g of potassium chloride were dry ground and mixed to provide a raw material which was subsequently fired at 1,100° C. for 4 hours. After the firing, a sample was immersed in 10 kg of purified water, stirred for 20 hours, separated, washed with water and then dried at 110° C. The resulting white powder was identified as layered titanate $K_{0.8}Li_{0.27}Ti_{1.73}O_4$ and had a mean major length of 44 μm and an interplanar spacing (unit thickness) a of 0.778 nm.

Synthesis Example 2

79.2 liter of a 10.9 aqueous slurry of the layered titanate obtained in Synthesis Example 1 was prepared, 4.7 kg of a 10% aqueous solution of sulfuric acid was added, a pH of the slurry was adjusted to 7.0. This slurry was separated, washed with water, dried at 110° C. and then fired at 600° C. for 12 hours. The resulting white powder was identified as layered titanate $K_{0.6}Li_{0.27}Ti_{1.73}O_{3.9}$ and had a mean major length of 44 μm and an interplanar spacing (unit thickness) a of 0.776 nm.

Synthesis Example 3

27.64 g of sodium carbonate, 4.91 g of lithium carbonate and 69.23 g of titanium dioxide were dry ground and mixed to provide a raw material which was subsequently fired at 950° C. for 4 hours. After the firing, a sample was immersed in 10 kg of purified water, stirred for 20 hours, separated, washed with water and then dried at 110° C. The resulting white powder was identified as layered titanate $K_{0.8}Li_{0.27}Ti_{1.73}O_4$ and had a mean major length of 9 μm and an interplanar spacing (unit thickness) a of 0.777 nm.

Synthesis Example 4

88.84 g of cesium carbonate and 69.23 g of titanium dioxide were dry ground and mixed to provide a raw material which was subsequently fired at 800° C. for 40 hours. After the firing, a sample was immersed in 10 kg of deionized water, stirred for 20 hours, separated, washed with water and then dried at 110° C. The resulting white powder was identified as layered titanate $Cs_{0.7}Ti_{1.83}O_4$ and had a mean major length of 1 μm and an interplanar spacing (unit thickness) a of 0.937 nm.

(Synthesis of Layered Titanic Acid in the Form of Nanosheets)

Synthesis Example 5

80 g of 35% hydrochloric acid was diluted with 8 kg of deionized water. Thereafter, 83 g of 12-aminododecanoic acid was added for dissolution thereinto. 130 g of the layered titanate of Synthesis Example 1 was further added and reacted at 80° C. for 1 hour. Subsequently, the reaction solution was separated by suction filtration, washed with hot water, dried in the air at 40° C. and further vacuum dried at 160° C. for 12 hours. As a result, a layered titanic acid in the form of nanosheets, measuring 42 μm in mean major length L, was obtained. Its aspect ratio Z (=L/a) in the resin composition is 53,985.

Synthesis Example 6

80 g of 35% hydrochloric acid was diluted with 8 kg of deionized water. Thereafter, 21 g of octadecylamine was added for dissolution thereinto. 13 g of the layered titanate of Synthesis Example 1 was further added and reacted at 80° C. for 1 hour. Subsequently, the reaction solution was separated by suction filtration, washed sufficiently with a mixed solution of water and ethanol, dried in the air at 40° C. and further vacuum dried at 160° C. for 12 hours. As a result, a layered titanic acid in the form of nanosheets, measuring 41 μm in mean major length L, was obtained. Its aspect ratio Z (=L/a) in the resin composition is 52,699.

Synthesis Example 7

130 g of the layered titanate of Synthesis Example 1 was dispersed with stirring in 5 kg of 1.75% hydrochloric acid, separated, washed thrice with water to provide a layered titanic acid containing hydrogen or hydronium ions exchanged for K ions and Li ions. 50 g of this layered titanic acid was further dispersed in 4 kg of deionized water. While this dispersion was heated and stirred at 80° C., 500 g water/isopropanol mixture containing 131 g of bis(polyoxyethylene) coconut oil alkylamine dissolved therein was added. After an hour of heating and stirring, the resultant was filtered, washed sufficiently with a deionized water/isopropanol mixture at 80° C., dried in the air at 40° C., and further vacuum dried at 160° C. for 12 hours. As a result, a layered titanic acid in the form of nanosheets, measuring 42 μm in mean major length L, was obtained. Its aspect ratio Z (=L/a) in the resin composition is 54,123.

Synthesis Example 8

The layered titanate of Synthesis Example 1 was treated with dimethyldistearylammonium salt in the same manner as in Synthesis Example 7 to obtain a layered titanic acid in the form of nanosheets having a mean major length L of 42 μm. Its aspect ratio Z (=L/a) in the resin composition is 54,123.

Synthesis Example 9

The layered titanate of Synthesis Example 2 was treated with dodecylmethylbis(hydroxyethyl)ammonium salt in the same manner as in Synthesis Example 7 to obtain a layered titanic acid in the form of nanosheets having a mean major length L of 41 μm. Its aspect ratio Z (=L/a) in the resin composition is 52,835.

Synthesis Example 10

130 g of the layered titanate of Synthesis Example 3 was dispersed with stirring in 5 kg of 1.75% hydrochloric acid, separated, washed thrice with water to provide a layered titanic acid containing hydrogen or hydronium ions exchanged for K ions and Li ions. 18 g of this layered titanic acid was dispersed in 600 g of water, 285 g of a 0.6% aqueous solution of 3-methoxypropylamine added with stirring, stirring continued for 1 hour. Subsequently, 70 g of a hydrochloride of a cyclic phenoxyphosphazene, i.e., 1,1,3,3,6,6-phenoxy-1,3,6-triaza-2,3,5-tri-phosphonyl was added with stirring. After an hour of continuous stirring, the resultant was filtered, washed thrice with 800 g hot water, dried in the air at 40° C. and further vacuum dried at 160° C. for 12 hours. As a result, a layered titanic acid in the form of nanosheets, measuring 9 μm in mean major length L, was obtained. Analysis of a pyrolysis weight loss by TG/DTA and a phosphorus content by X-ray fluorescence revealed the layered titanic acid in the form of nanosheets as having layers between which 18.2 equivalent % of 3-methoxy-propylamine and 7.9 equivalent % of 1,1,3,3,6,6-phenoxy-1,3,6-triaza-2,3,5-triphosphonyl, based on an ion exchange capacity of the layered titanate, were inserted. Its aspect ratio Z (=L/a) in the resin composition is 11,583.

Synthesis Example 11

130 g of the layered titanate of Synthesis Example 4 was dispersed with stirring in 5 kg of 1.75% hydrochloric acid, separated, washed thrice with water to provide a layered titanic acid containing hydrogen or hydronium ions exchanged for Cs ions. 18 g of this layered titanic acid was dispersed in 600 g water, 285 g of a 0.6% aqueous solution of 3-methoxypropylamine added with stirring, stirring continued for 1 hour. Subsequently, 90 g of melamine cyanurate was added with stirring. After an hour of continuous stirring, the resultant was filtered, washed thrice with 800 g hot water, dried in the air at 40° C. and further vacuum dried at 160° C., for 12 hours. As a result, a layered titanic acid in the form of nanosheets, measuring 1 μm in mean major length L, was obtained. Analysis of a pyrolysis weight loss by TG/DTA and a phosphorus content by x-ray fluorescence revealed the layered titanic acid in the form of nanosheets as having layers between which 21.1 equivalent % of 3-methoxy-propylamine and 6.5 equivalent % of melamine cyanurate, based on an ion exchange capacity of the layered titanate, were inserted. Its aspect ratio Z (=L/a) in the resin composition is 1,067.

Synthesis Example 12

130 g of the layered titanate of Synthesis Example 3 was dispersed with stirring in 5 kg of 1.75% hydrochloric acid, separated, washed thrice with water to provide a layered titanic acid containing hydrogen or hydronium ions exchanged for K ions and Li ions. 50 g of this layered titanic acid was dispersed in 2 kg of water. While this dispersion was heated and stirred at 80° C., 190 g of a hydrochloride of cyclic phenoxyphosphazene, i.e., 1,1,3,3,6,6-phenoxy-1,3,6-triaza-2,3,5-triphosphonyl was added. After an hour of continuous stirring, the resultant was filtered, washed thrice with 800 g hot water, dried in the air at 40° C. and further vacuum dried at 160° C. for 12 hours. As a result, a layered titanic acid in the form of nanosheets, measuring 9 μm in mean major length L, was obtained. Analysis of a phosphorus content by X-ray fluorescence revealed the layered titanic acid in the form of nanosheets as having layers between which 5.4 equivalent % of 1,1,3,3,6,6-phenoxy-1,3,6-triaza-2,3,5-triphosphonyl, based on an ion exchange capacity of the layered titanate, were inserted. Its aspect ratio z (=L/a) in the resin composition is 11,583.

(Thermosetting Resin Composition)

Example 1

30 g of a bisphenol A epoxy resin (EPICOAT 828, product of Japan Epoxy Resin Co., Ltd.) as the most general thermosetting resin was charged into a 100 ml vessel equipped with a stirrer. 20 parts of the layered titanic acid in the form of nanosheets obtained in Synthesis Example 5, based on 100 parts of the resin, was charged. The vessel contents were stirred at 110° C. for 1 hour. Thereafter, 5 parts of N,N-dimethylbenzylamine was charged. After gelation was found to have proceeded properly, the vessel contents were introduced into a mold where they were allowed to cure at 100° C. for 1 hour and then at 150° C. for 5 hours, so that a 1/16 in. thick, 5 in. long and 0.5 in. wide test piece as set forth in the UL94 testing protocol was prepared. With this test piece, a flame retardance test was carried out according to UL94 testing procedures. The occurrence of dripping, influential to flame spread prevention, was judged by visually observing if a surgical cotton placed 20 cm beneath the test piece was ignited by burning drips (drip resistance). As a result, the test piece achieved a UL94 V-0 flame retardance rating as ignition of the surgical cotton by burning drips was not observed. X-ray diffraction measurement of the resin composition revealed enlargement of an interplanar spacing of the layered titanic acid in the form of nanosheets.

Example 2

30 g of a bisphenol A epoxy resin (EPICOAT 828, product of Japan Epoxy Resin Co., Ltd.) as the most general thermosetting resin was charged into a 100 ml vessel equipped with a stirrer. 5 parts of the layered titanic acid in the form of nanosheets obtained in Synthesis Example 6 and 1 part of a crosslinked phenoxyphosphazene oligomer (SPB-100, product of Otsuka Chemical Co., Ltd.), based on 100 parts of the resin, were added. The vessel contents were stirred at 110° C. for 1 hour. Thereafter, 5 parts by weight of N,N-dimethylbenzyl-amine was charged. After gelation was found to have proceeded properly, the vessel contents were introduced into a mold where they were allowed to cure at 100° C. for 1 hour and then at 150° C. for 5 hours, so that a test piece set forth in the UL94 testing protocol was prepared. With this test piece, a flame retardance test was carried out according to UL94 testing procedures. The occurrence of dripping, influential to flame spread prevention, was judged by visually observing if a surgical cotton placed 20 cm beneath the test piece was ignited by burning drips (drip resistance). As a result, the test piece achieved a UL94 V-0 flame retardance rating as ignition of the surgical cotton by burning drips was not observed. X-ray diffraction measurement of the resin composition revealed enlargement of an interplanar spacing of the layered titanic acid in the form of nanosheets.

Examples 3-14

The types and amounts of the layered titanic acid in the form of nanosheets and the flame retardant added concurrently to 100 parts of the epoxy resin were varied. Otherwise, the procedure of Example 1 was followed. The results of a flame retardance test and a drip resistance test set forth in the UL94 testing protocol are shown in Table 1. The results of Examples 1 and 2 are also shown in Table 1. X-ray diffraction measurement of either resin composition revealed enlargement of an interplanar spacing of the layered titanic acid in the form of nanosheets.

TABLE 1

| | Layered Titanic Acid in the Form of Nanosheets | | Type and Amount of Flame Retardant Added | Flame Retardance Rating | Evaluation of Drip |
|---|---|---|---|---|---|
| | Type | Amount | Concurrently | (UL94) | Resistance |
| Ex. 1 | Synthesis Ex. 5 | 20 Parts | None | V-0 | ○ |
| Ex. 2 | Synthesis Ex. 6 | 5 Parts | Crosslinked Phenoxyphosphazene Oligomer (1 Part) | V-0 | ○ |
| Ex. 3 | Synthesis Ex. 6 | 20 Parts | None | V-0 | ○ |
| Ex. 4 | Synthesis Ex. 7 | 20 Parts | None | V-0 | ○ |
| Ex. 5 | Synthesis Ex. 10 | 5 Parts | None | V-0 | ○ |
| Ex. 6 | Synthesis Ex. 11 | 5 Parts | None | V-0 | ○ |
| Ex. 7 | Synthesis Ex. 5 | 3 Parts | Crosslinked Phenoxyphosphazene Oligomer (1 Part) | V-0 | ○ |
| Ex. 8 | Synthesis Ex. 5 | 10 Parts | Crosslinked Phenoxyphosphazene Oligomer (0.5 Parts) | V-0 | ○ |
| Ex. 9 | Synthesis Ex. 6 | 3 Parts | Condensation-Crosslinked Diphenyl Phosphate Ester (1 Part) | V-0 | ○ |
| Ex. 10 | Synthesis Ex. 5 | 5 Parts | Melamine Isocyanurate (5 Parts) | V-0 | ○ |
| Ex. 11 | Synthesis Ex. 6 | 3 Parts | Magnesium Hydroxide (20 Parts) | V-0 | ○ |
| Ex. 12 | Synthesis Ex. 5 | 3 Parts | Aluminum Hydroxide (20 Parts) | V-0 | ○ |
| Ex. 13 | Synthesis Ex. 5 | 3 Parts | Particulate Silica (20 Parts) | V-0 | ○ |
| Ex. 14 | Synthesis Ex. 6 | 5 Parts | Silicone Polymer (20 Parts) | V-0 | ○ |

Evaluation of Drip Resistance:
○ = Ignition Not Occurred
X = Ignition Occurred

Example 15

10 g of polypyromellitic acid amine (polyimide precursor) and 100 ml of dimethylacetamide were charged into a 300 ml vessel equipped with a stirrer. 5 parts of the layered titanic acid in the form of nanosheets obtained in Synthesis Example 5, based on 100 parts of the resin, was charged. The vessel contents were stirred at room temperature for 12 hours, transferred onto a fluorinated resin sheet covering a mold and allowed to cure under a nitrogen stream at 150° C. for 12 hours and then at 300° C. for 5 hours, so that a test piece set forth in the UL94 testing protocol was prepared. With this test piece, a flame retardance test was carried out according to the UL94 testing procedures. In this test, the occurrence of dripping, influential to flame spread prevention, was judged by visually observing if a surgical cotton placed 20 cm beneath the test piece was ignited by burning drips (drip resistance). As a result, the test piece achieved a UL94 V-0 flame retardance rating as ignition of the surgical cotton by burning drips was not observed. X-ray diffraction measurement of the resin composition revealed enlargement of an interplanar spacing of the layered titanic acid in the form of nanosheets.

Comparative Example 1

80 g of Na-montmorillonite (Kunipia F, product of Kunimine Industries Co., Ltd.) was dispersed in 5 L of 80° C.

deionized water. 28.5 g of 12-aminododecanoic acid and 1 mL of conc. hydrochloric acid were dissolved in 2 L of 80° C. deionized water. This solution was added to the above montmorillonite dispersion while stirred. The resulting precipitate was filtered, washed thrice with 2 L of 80° C. deionized water, dried in the air at 40° C. and further vacuum dried at 110° C. for 12 hours. As a result, montmorillonite modified organically with 12-aminododecanoic acid was obtained.

This organically modified montmorillonite was used in place of the layered titanic acid in the form of nanosheets in Example 1 to carry out the same tests as performed above for epoxy resin compositions. The results of a flame retardance test and a drip resistance test set forth in the UL94 testing protocol are shown in Table 2.

Various types of organically modified montmorillonites were synthesized using the same method as used in Comparative Example 1 and subjected to the same tests as performed above for epoxy resin compositions. The results of a flame retardance test and a drip resistance test set forth in the UL94 testing protocol are shown in Table 2.

used in Example 1. As a result, the test piece achieved a UL94 V-0 flame retardance rating as ignition of the surgical cotton by burning drips was not observed. X-ray diffraction measurement of the resin composition revealed enlargement of an interplanar spacing of the layered titanic acid in the form of nanosheets.

Example 17

5 parts of the layered titanic acid in the form of nanosheets obtained in Synthesis Example 8 and 1 part of a crosslinked phenoxyphosphazene oligomer (SPB-100, product of Otsuka Chemical Co., Ltd.) were added to 100 parts of a polyphenylene sulfite resin. The resultant was kneaded in a Labo Plastomill (product of Toyo Seiki Seisaku-sho Ltd.) under conditions of a kneading temperature of 290° C., 60 rpm and a period of 5 minutes. The resulting resin composition was removed, crushed and then processed by an injection molding machine (product name Minimat M26, product of Sumitomo Heavy Industries Ltd., cylinder temperature 300° C., mold

TABLE 2

| | Organically Treated Montmorillonite | | Type and Amount of | Flame Retardance | Evaluation |
|---|---|---|---|---|---|
| | Intercalating Organic Type | Amount | Flame Retardant Added Concurrently | Rating (UL94) | of Drip Resistance |
| Comp. Ex. 1 | 12-Aminododecanoic Acid | 20 Parts | None | Burned | X |
| Comp. Ex. 2 | 12-Aminododecanoic Acid | 3 Parts | Crosslinked Phenoxyphosphazene Oligomer (1 Part) | V-2 | X |
| Comp. Ex. 3 | Octadecylamine | 5 Parts | Crosslinked Phenoxyphosphazene Oligomer (1 Part) | V-2 | X |
| Comp. Ex. 4 | Bis (Polyoxyethylene) Coconut Oil Alkylamine | 5 Parts | Crosslinked Phenoxyphosphazene Oligomer (1 Part) | Burned | X |
| Comp. Ex. 5 | Octadecylamine | 3 Parts | Magnesium Hydroxide (20 Parts) | V-2 | X |
| Comp. Ex. 6 | 12-Aminododecanoic Acid | 3 Parts | Aluminum Hydroxide (20 Parts) | V-2 | X |
| Comp. Ex. 7 | 12-Aminododecanoic Acid | 3 Parts | Particulate Silica (20 Parts) | Burned | X |

Evaluation of Drip Resistance:
○ = Ignition Not Occurred
X = Ignition Occurred (Thermoplastic Resin Composition)

Example 16

5 parts of the layered titanic acid in the form of nanosheets obtained in Synthesis Example 6 and 1 part of a crosslinked phenoxyphosphazene oligomer (SPB-100, product of Otsuka Chemical Co., Ltd.) were added to 100 parts of a polypropylene resin. The resultant was kneaded in a Labo Plastomill (product of Toyo Seiki Seisaku-sho Ltd.) under the conditions of a kneading temperature of 230° C., 60 rpm and a period of 5 minutes. The resulting resin composition was removed, crushed and then processed by an injection molding machine (product name Minimat M26, product of Sumitomo Heavy Industries Ltd., cylinder temperature 240° C., mold temperature 50° C.) into a flame retardance test piece as set forth in the UL94 testing protocol. With this test piece, a flame retardance test was carried out according to the UL94 testing procedures. Also in this case, the occurrence of dripping, influential to flame spread prevention, was judged by the same method as temperature 110° C.) into a flame retardance test piece as set forth in the UL94 testing protocol. With this test piece, a flame retardance test was carried out according to the UL94 testing procedures. Also in this case, the occurrence of dripping, influential to flame spread prevention, was judged by the same method as used in Example 1. As a result, the test piece achieved a UL94 V-0 flame retardance rating as ignition of the surgical cotton by burning drips was not observed. X-ray diffraction measurement of the resin composition revealed enlargement of an interplanar spacing of the layered titanic acid in the form of nanosheets.

Examples 18-22

Various types of resins were used. The type of the layered titanic acid in the form of nanosheets was varied, while its amount was sustained at 5 parts by weight, based on 100 parts of the resin used. The type and amount of the flame retardant added together with the layered titanic acid in the form of nanosheets were varied. Otherwise, the procedure of Example 16 was followed. The results of a flame retardance test and a drip resistance test set forth in the UL94 testing protocol are shown in Table 3. X-ray diffraction measurement of either resin composition revealed enlargement of an interplanar spacing of the layered titanic acid in the form of nanosheets.

50-100,000 exhibits far higher gas and liquid barrier properties, compared to montmorillonite having an aspect ratio of approximately 100-500 at the most. Another reason is that the layered titanic acid exhibits about a half the thermal diffusivity and conductivity of the layered titanate and thus shows higher heat resistance as a filler.

TABLE 3

| | Resin Type | Layered Titanic Acid in the Form of Nanosheets | Type and Amount of Flame Retardant Added Concurrently | Flame Retardance Rating (UL94) | Evaluation of Drip Resistance |
|---|---|---|---|---|---|
| Ex. 18 | Polylactic Acid | Synthesis Ex. 9 | Crosslinked Phenoxyphosphazene Oligomer (5 Parts) | V-0 | ○ |
| Ex. 19 | Polypropylene | Synthesis Ex. 8 | Crosslinked Phenoxyphosphazene Oligomer (5 Parts) | V-0 | ○ |
| Ex. 20 | PBT | Synthesi Ex. 6 | Crosslinked Phenoxyphosphazene Oligomer (5 Parts) | V-0 | ○ |
| Ex. 21 | Nylon 6 | Synthesis Ex. 5 | Crosslinked Phenoxyphosphazene Oligomer (5 Parts) | V-0 | ○ |
| Ex. 22 | NBR | Synthesis Ex. 8 | Crosslinked Phenoxyphosphazene Oligomer (5 Parts) | V-0 | ○ |

Evaluation of Drip Resistance:
○ = Ignition Not Occurred
X = Ignition Occurred

Comparative Examples 7-11

Various types of organically modified montmorillonites were synthesized using the same method as used in Comparative Example 1. Using each organically modified montmorillonite in the amount of 5 parts of the resin, the same tests as in Comparative Example 1 were performed. The results of a flame retardance test and a drip resistance test set forth in the UL94 testing protocol are shown in Table 4.

(Water Absorption Test)

Next, a water absorption test was performed for a resin incorporating the layered titanic acid in the form of nanosheets according to the present invention. For a comparative purpose, montmorillonite was also used. Both of the layered titanic acid in the form of nanosheets and montmorillonite were intercalated with 12-aminodedecanoic acid. An epoxy resin, as similar to the above, was used as the resin. Loading was 5 parts. A 5 cm×5 cm×1 mm plate-like sample

TABLE 4

| | Resin Type | Intercalating Organic Type | Type and Amount of Flame Retardant Added Concurrently | Flame Retardance Rating (UL94) | Evaluation of Drip Resistance |
|---|---|---|---|---|---|
| Comp. Ex. 7 | Polylactic Acid | Dodecylmethylbis (Hydroxyethyl) Ammonium Salt | Crosslinked Phenoxyphosphazene Oligomer (5 Parts) | Burned | X |
| Comp. Ex. 8 | Polypropylene | Dimethyldistearyl-ammonium Salt | Crosslinked Phenoxyphosphazene Oligomer (5 Parts) | V-2 | X |
| Comp. Ex. 9 | PBT | Octadecylamine | Crosslinked Phenoxyphosphazene Oligomer (5 Parts) | Burned | X |
| Comp. Ex. 10 | Nylon 6 | 12-Aminododecanoic Acid | Crosslinked Phenoxyphosphazene Oligomer (5 Parts) | V-2 | X |
| Comp. Ex. 11 | NBR | Dimethyldistearyl-ammonium Salt | Crosslinked Phenoxyphosphazene Oligomer (5 Parts) | V-2 | X |

Evaluation of Drip Resistance:
○ = Ignition Not Occurred
X = Ignition Occurred

As can be seen from these results, the layered titanic acid in the form of nanosheets exhibits much higher flame retardance compared to montmorillonite which is a layered titanate. One reason is that the layered titanic acid having an aspect ratio of was immersed in purified water. After 5 hours, the percent change in weight of the sample, on the initial value basis, was measured and designated as a water absorption. The evaluation results are shown in Table 5.

TABLE 5

|  | Epoxy Resin Alone | Layered Titanic Acid in the Form of Nanosheets-Epoxy Composition | Montmorillonite-Epoxy Composition |
|---|---|---|---|
| Water Absorption (%) | 2.08 | 1.04 | 3.02 |

As can be seen from Table 5, the epoxy resin composition incorporating the layered titanic acid in the form of nanosheets according to the present invention exhibits a lower water absorption, compared to the epoxy resin alone and the epoxy resin composition incorporating the montmorillonite, and thus shows improved barrier properties. It is believed that, due to this improved barrier properties, the superior flame retardance imparting effect, as described above, is obtained.

(Evaluation of Thermal Conductivity of Filler)

Since it is impossible to measure a thermal conductivity of the layered titanic acid in the form of nanosheets, the layered titanate as a substitute and a comparative, synthetic layered silicate (synthetic mica) were measured for thermal conductivity. Each filler was pressed into a 1 mm thick, 13 mm diameter circular disc and then measured for thermal conductivity. The measurement results are shown in Table 6.

TABLE 6

|  | Layered Titanate | Synthetic Layered Silicate (Synthetic Mica) |
|---|---|---|
| Thermal Diffusivity (Planar Direction) [$10^{-3}$ cm$^2$/s] | 1.43 | 2.32 |
| Thermal Conductivity (Thickness Direction) [W/m · K] | 0.25 | 0.47 |

As can be seen from Table 6, the layered titanate exhibits a lower thermal conductivity, compared to the synthetic layered silicate. It is accordingly believed that the layered titanic acid in the form of nanosheets according to the present invention, which was made using the layered titanate as a raw material, also exhibits a low thermal conductivity. It is believed that, due to this low thermal conductivity leading to improved heat-insulating properties, the superior flame retardance imparting effect, as described above, is obtained.

(Evaluation of Mechanical Strength and Heat Resistance)

The same resin compositions as used in the water absorption test were prepared and measured for bend strength (flexural strength) and heat resistance (glass transition point Tg). The measurement results are shown in Table 7.

TABLE 7

|  | Epoxy Resin Alone | Layered Titanic Acid in the Form of Nanosheets-Epoxy Composition | Montmorillonite-Epoxy Composition |
|---|---|---|---|
| Flexural Modulus (GPa) | 2.74 | 3.22 | 3.04 |
| Tg (° C.) | 118 | 138 | 119 |

As can be clearly seen from Table 7, the epoxy resin composition incorporating the layered titanic acid in the form of nanosheets, according to the present invention, exhibits the improved mechanical strength and heat resistance, compared to the epoxy resin composition incorporating the montmorillonite.

The invention claimed is:

1. A flame retardant for incorporation in a resin to impart flame retardance thereto, characterized as comprising a layered titanic acid in the form of nanosheets intercalated either with an organic basic compound and a halogen-free phosphazene compound or halogen-free flame-retardant nitrogen hetero-cyclic compound, or with a halogen-free phosphazene compound or halogen-free flame-retardant nitrogen heterocyclic compound.

2. The flame retardant as recited in claim 1, characterized in that said layered titanic acid in the form of nanosheets is obtained by treating a layered titanate with an acid or hot water and then allowing an organic basic compound and a halogen-free phosphazene compound or halogen-free flame-retardant nitrogen heterocyclic compound to act on the layered titanate, or alternatively, allowing a halogen-free phosphazene compound or halogen-free flame-retardant nitrogen heterocyclic compound alone to act on the layered titanate to thereby effect swelling of interlayer spaces or delamination.

3. The flame retardant as recited in claim 1, characterized in that said layered titanic acid in the form of nanosheets is obtained by treating a layered titanate with an acid or hot water and allowing an organic basic compound and/or a halogen-free phosphazene compound or halogen-free flame-retardant nitrogen heterocyclic compound to act on the layered titanate, in one pot, to effect swelling of interlayer spaces or delamination.

4. The flame retardant as recited in claim 2, characterized in that said layered titanate is represented by a general formula $A_xM_y\square Ti_{2-(y+z)}O_4$ (in the formula, A and M are metals differing from each other and having a valence of 1-3, $\square$ is a defective site of Ti, x is a positive real number satisfying $0<x<1.0$, and y and z are independently 0 or a positive real number satisfying $0<y+z<1.0$).

5. The flame retardant as recited in claim 2, characterized in that said layered titanate is represented by $K_{0.5-0.8}Li_{0.27}Ti_{1.73}O_{3.85-4}$.

6. A flame-retardant resin composition characterized as containing 0.5-50 parts by weight of the layered titanic acid in the form of nanosheets as recited in claim 1, based on 100 parts by weight of a resin.

7. The flame-retardant resin composition as recited in claim 6, characterized in that said layered titanic acid in the form of nanosheets in the resin exhibits an aspect ratio (Z) in the range of 50-100,000.

8. The flame-retardant resin composition as recited in claim 6, characterized in that, besides said layered titanic acid in the form of nanosheets, it further contains 0.01-50 parts by weight of a halogen-free phosphazene compound, based on 100 parts by weight of the resin.

9. The flame-retardant resin composition as recited in claim 6, characterized in that, besides said layered titanic acid in the form of nanosheets, it further contains 0.01-50 parts by weight of a halogen-free organic or inorganic flame retardant, based on 100 parts by weight of the resin.

10. The flame-retardant resin composition as recited in claim 6, characterized in that said resin is a thermosetting resin.

11. The flame-retardant resin composition as recited in claim 6, characterized in that said resin is a thermoplastic resin.

12. The flame-retardant resin composition as recited in claim 6, characterized in that said resin is a biodegradable resin.

13. The flame-retardant resin composition as recited in claim 6, characterized in that said resin is an engineering plastic.

14. The flame-retardant resin composition as recited in claim 6, characterized in that said resin is a rubber.

15. The flame-retardant resin composition as recited in claim 6, characterized in that it achieves a V-0 or V-1 rating in the UL94 flame retardance test.

16. A resin product characterized in that it is obtained by processing the flame-retardant resin composition as recited in claim 6.

* * * * *